(12) United States Patent
Maurice

(10) Patent No.: US 7,653,182 B2
(45) Date of Patent: Jan. 26, 2010

(54) METHOD OF MANAGING PERSONAL DATA ABOUT USERS OF VOICE SERVICES AND AN APPLICATION SERVER FOR EXECUTING THE METHOD

(75) Inventor: Xavier Maurice, Montrouge (FR)

(73) Assignee: France Telecom, Paris (FR)

( * ) Notice: Subject to any disclaimer, the term of this patent is extended or adjusted under 35 U.S.C. 154(b) by 908 days.

(21) Appl. No.: 11/338,048

(22) Filed: Jan. 24, 2006

(65) Prior Publication Data

US 2006/0165069 A1 Jul. 27, 2006

(30) Foreign Application Priority Data

Jan. 24, 2005 (FR) ................................. 05 00695

(51) Int. Cl.
*H04M 1/64* (2006.01)
(52) U.S. Cl. .................................... 379/88.02; 704/273

(58) Field of Classification Search ............. 379/88.02, 379/88.25, 201.01; 704/273, 236, 246, 248
See application file for complete search history.

(56) References Cited

U.S. PATENT DOCUMENTS

| | | | |
|---|---|---|---|
| 6,697,478 B1* | 2/2004 | Meldrum et al. | 379/211.04 |
| 7,110,745 B1* | 9/2006 | Smith et al. | 455/411 |
| 7,308,080 B1* | 12/2007 | Moriuchi et al. | 379/88.04 |
| 2002/0085687 A1* | 7/2002 | Contractor et al. | 379/76 |
| 2005/0063529 A1* | 3/2005 | Meldrum et al. | 379/211.04 |

FOREIGN PATENT DOCUMENTS

| | | |
|---|---|---|
| EP | 1 307 019 A | 5/2003 |
| WO | WO 02/054808 A | 7/2002 |

* cited by examiner

*Primary Examiner*—Creighton Smith
(74) *Attorney, Agent, or Firm*—Cohen Pontani Lieberman & Pavane LLP

(57) ABSTRACT

The application server includes means for commanding a voice resource server to set up a dialogue with a user for the user to agree or refuse to supply personal data, for example location data, to a service provider.

7 Claims, 2 Drawing Sheets

# METHOD OF MANAGING PERSONAL DATA ABOUT USERS OF VOICE SERVICES AND AN APPLICATION SERVER FOR EXECUTING THE METHOD

BACKGROUND OF THE INVENTION

The present invention concerns the use of personal data about a subscriber to a telephony operator by a third party voice service provider. More particularly the present invention relates to a method and to a device operative before such use to inform the subscriber of that use and to guarantee the subscriber's agreement to that use.

Prior to collecting personal data about a subscriber or transmitting that data to a third party for providing a service, the operation of informing the user and obtaining the user's explicit agreement thereto is known to the person skilled in the art as "opting in".

In contrast, in "opting out" the user's agreement is implicit by default.

The invention applies in particular, and in non-limiting manner, to proximity services (based on location), for which a third party service provider requires subscriber location information.

Clearly a user's location is sensitive personal data that the user may not necessarily wish to communicate to a third party without explicitly agreeing to do so.

In the context of the invention, the explicit agreement or refusal of the user to communicate personal data to a service provider is obtained via a voice platform in Voice Service Provider (VSP) mode accessed via a telephone terminal by entering the access number of the service.

The platform is referred to below as the "voice resource server".

A VSP offer is one whereby an operator supplies a service provider with an access network and a voice platform, the development and the hosting of voice applications specific to that service being a matter for the service provider.

In one aspect, the invention avoids re-routing voice calls between the equipments of the telephony operator and those used by the service provider; and In another aspect, the invention ensures that the user is solicited only for calls to a service provider for which personal data is actually required.

SUBJECT MATTER AND SUMMARY OF THE INVENTION

To this end, the invention relates to an application server that can be hosted by a telephony operator, comprising:
means for obtaining personal data of a user from said operator; and
means for communicating with a third party voice resource server adapted to:
  receive from the voice resource server a request for obtaining at least one item of personal data with the aim of sending it to a predetermined service provider;
  send to that voice resource server digital data that is not interpreted by said voice resource server and that is used in a voice call between the voice resource server and said user to obtain the user's authorization or refusal to supply said personal data to the predetermined service provider;
  receive digital data representing said user's response via the voice resource server, said response data not being interpreted by said voice resource server; and
  send said personal data to said voice resource server if said response represents said user's authorization.

The invention relates to a related method of managing personal data of a user who is a subscriber of a telephony operator, said management method comprising:
  a step of receiving from the voice resource server a request for obtaining at least one item of personal data with the aim of sending it to a predetermined service provider;
  a step of sending to that voice resource server digital data that is not interpreted by said voice resource server and that is used in a voice call between the voice resource server and said user to obtain the user's authorization or refusal to supply said personal data to the predetermined service provider;
  a step of receiving digital data representing said user's response via the voice resource server, said response data not being interpreted by said voice resource server; and
  a step of sending said personal data to said voice resource server if said response represents said user's authorization Thus when the user accesses a predetermined service for which personal data is required via the voice resource server, the voice resource server can send a request to the application server to obtain that data.

The application server then supplies the voice resource server with digital data in accordance with a predefined scenario, enabling the voice resource server to obtain the user's agreement or refusal via the communications channel set up at the time of the call from the user.

The user's agreement or refusal is then transmitted to the application server of the telephony operator which can decide, as a function of that response, whether the personal data should be sent to the service provider or not.

Most advantageously, the digital data used for the voice dialogue with the user and the response from the user are not interpreted by the voice resource server. The server is then used only for its voice resources as such, and has no intelligence enabling it to interpret the user's authorization or refusal to supply personal data.

The person skilled in the art will understand that the voice resources referred to here consist of a set of functions in particular for synthesizing a voice message from digital data, or more generally for vocalizing, for recognizing a DTMF code entered on the terminal of the user, or for recognizing a keyword spoken by the user.

The application server and the method of the invention therefore remedy some or all drawbacks of prior art.

The only voice call necessary to obtain personal data is that set up between the telephone terminal of the user and the voice resource server of the third party, which call is not rerouted.

Additionally, the user is asked to authorize the supply of personal data only at the specific request of the service provider and in accordance with a predefined scenario stored in the application server.

The invention relates to different types of personal data, and generally speaking all the personal data available from the application server of the telephony operator.

The personal data may in particular be user location data that the application server obtains from a location server managed by the same operator.

In one embodiment, the calls set up between the application server and the voice resource server of the third party employ data links conforming to the Voice extensible Mark up Language (VXML) standard.

For more information on the VXML standard, the person skilled in the art can refer to the recommendations published on 20 Feb. 2003 by the W3C Consortium, which are available at the address http@//www.w3.org/TR/2003/CR-voicexml20-20030220.

In one implementation, the various steps of the management method are determined by instructions of computer programs.

Consequently, the invention is also directed to a computer program on a data medium, the program being adapted to be executed in an application server and including instructions adapted to implement a management method as summarized briefly above.

The program may use any programming language, and may be in the form of source code, object code, or code intermediate between source code and object code, such as in a partially-compiled form, or in any other desirable form.

The invention also provides a data medium readable by an application server and carrying instructions for a computer program as mentioned above.

The data medium may be any entity or device capable of storing the program. For example, the medium may comprise storage means, such as a ROM, for example a CD-ROM or a microelectronic circuit ROM, or a magnetic recording medium, for example a diskette (floppy disk), or a hard disk.

Moreover, the data medium may be a transmissible medium such as an electrical or optical signal, which may be routed via an electrical or optical cable, by radio, or by other means. The program of the invention may in particular be downloaded over an Internet-type network.

The data medium may alternatively be an integrated circuit into which the program is incorporated, the circuit being adapted to execute or to be used in the execution of the method in question.

BRIEF DESCRIPTION OF THE DRAWINGS

Other features and advantages of the present invention emerge from the following description with reference to the appended drawings, which show an embodiment that is in no way limiting on the invention. In the drawings.

MORE DETAILED DESCRIPTION

Figure 1:
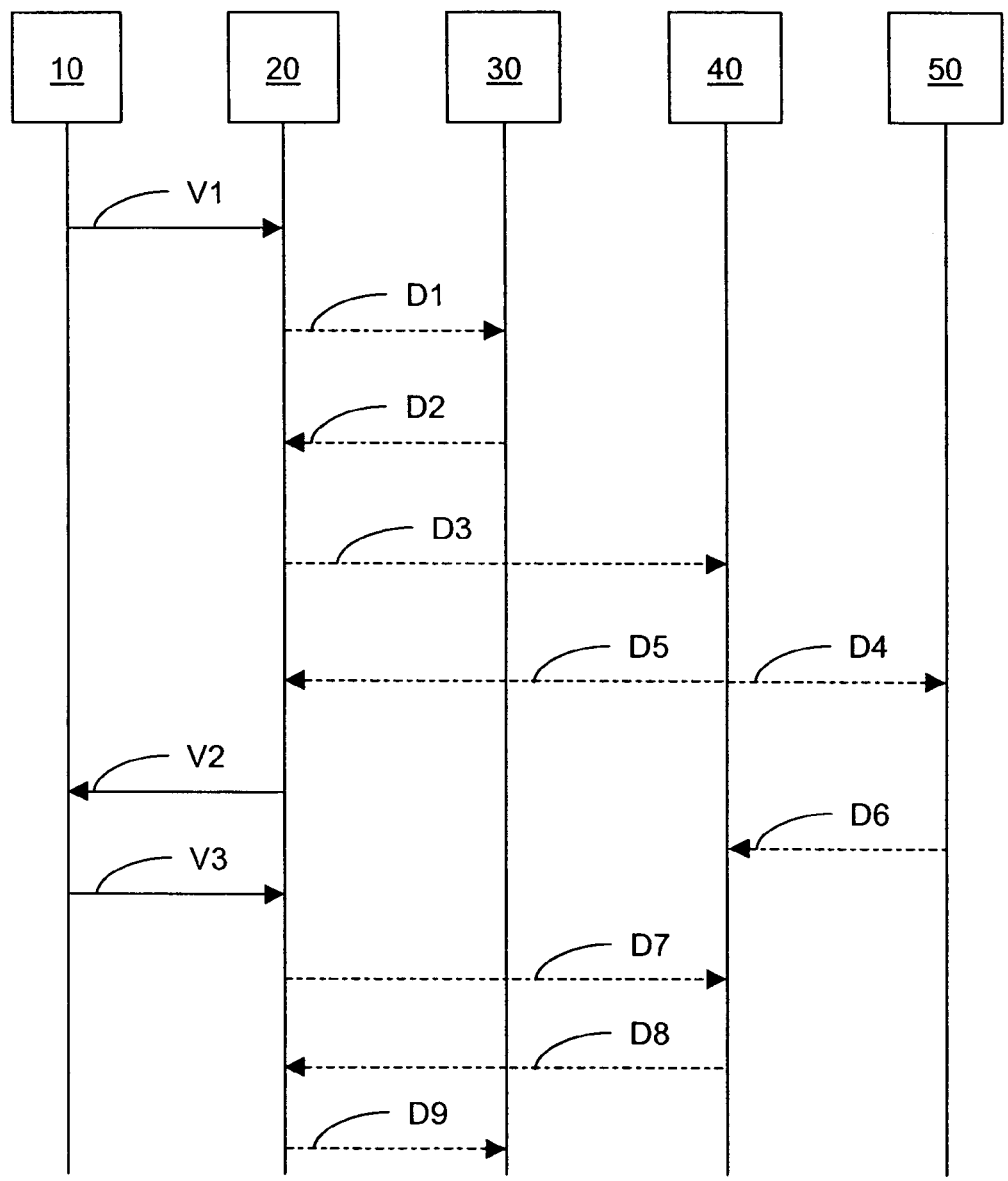
FIG. 1 represents a preferred embodiment of an application server of the invention and the use of that server in an "opt-in" operation.

FIG. 1 represents a telephone terminal 10 connected to the telephone network (not shown) of a telephony operator to which the terminal user is a subscriber.

It is assumed that the user wishes to access a service provided by a provider 30. To access that service, the user enters an access number for that service on the terminal 10. The call is routed to a voice resource server 20, in a manner that is known in the art, via the network of the telephony operator, and where applicable, via another network.

A first dialogue (represented by the solid line arrow V1) is then set up in the voice communications channel between the terminal 10 and the voice resource server 20.

The voice resource server 20 is a platform by means of which the telephony operator makes voice resources and network access resources for developing a voice application available to a third party.

On receipt of the call from the terminal 10, the voice resource server 20 invokes a voice application hosted by the service provider 30, as shown by the arrow D1 in FIG. 1.

In the figure, the dashed line arrows represent data messages.

In the present example it is assumed that the service requested by the user requires location data for the user. Consequently, the application hosted by the service provider 30 sends a message D2 to the voice resource server 20 for it to obtain the user location personal data from the telephony operator that manages that data.

On receipt of the message D2, the voice resource server sets up a call via a data link with an application server 40 of the invention.

In the preferred embodiment described here, the voice resource server 20 and the application server 40 communicate in application of the VXML standard.

Figure 2:
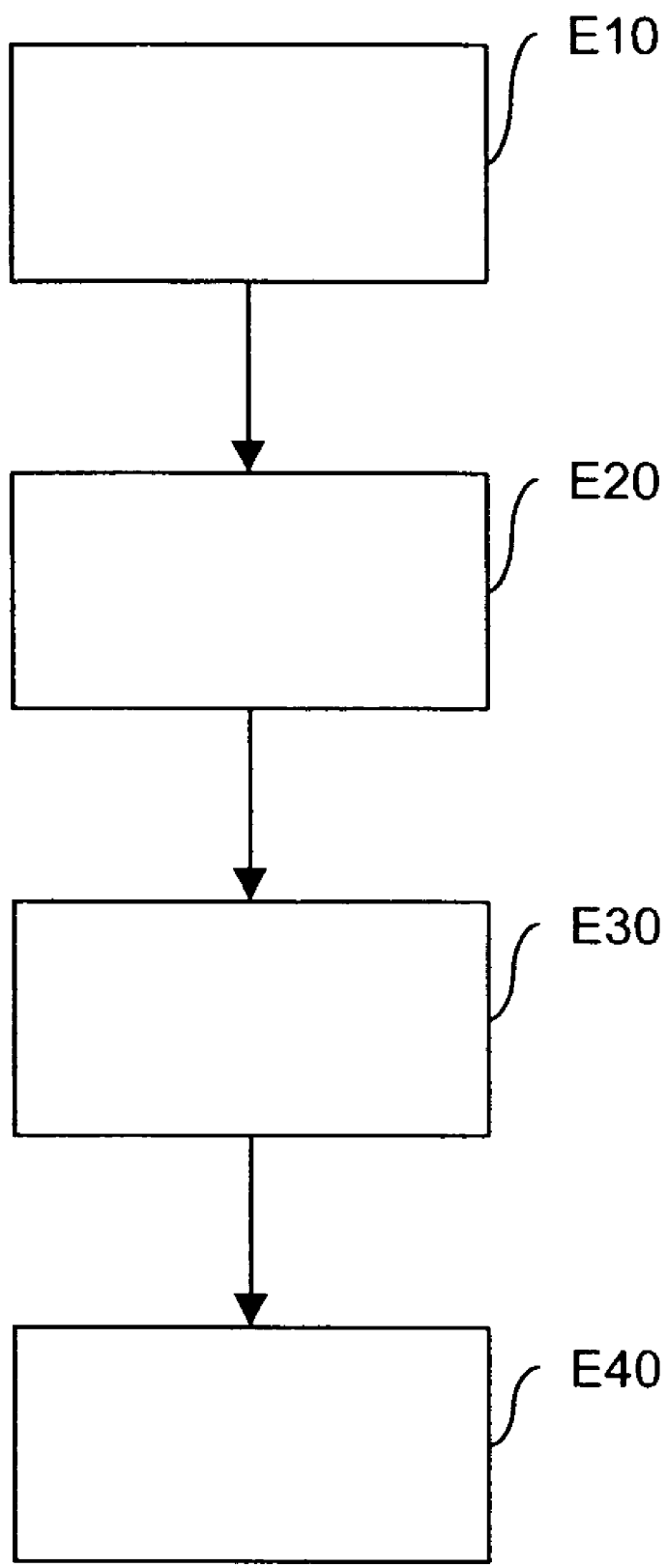
FIG. 2 is a flowchart representing the main steps of a preferred embodiment of a management method of the invention.

Be this as it may, the voice resource server 20 uses this data link to send a request D3 to the application server 40 to obtain the user location personal data with the aim of supplying it to the service provider 30. This request is received by the application server 40 during a step E10 represented in FIG. 2.

The request D3 includes in particular an identifier of the service requested by the user and an identifier of the terminal 10, for example its telephone number.

On receipt of the request D3, the application server effects two operations, that can be simultaneous.

Firstly, it sends a request D4 to a location server 50 managed by the telephony operator to obtain the user's location, this request including the number of the terminal 10, for example.

In parallel with this, in accordance with a predetermined scenario established beforehand with the service provider 30, the application server 40 sends digital data D5 to the voice resource server 20 during a step E20.

This digital data may consist of a file representing a spoken message that may be synthesized by the voice resource server 20, for example.

Be this as it may, the voice resource server 20 does not interpret this digital data. It merely uses it to generate a dialogue in the voice communications channel with the terminal 10 that has already been set up to obtain the user's authorization or refusal to supply the location personal data to the service provider 30.

The spoken message from the voice resource server to the user's terminal is represented by the arrow V2 and the user's response by the arrow V3.

It is assumed that during this dialogue the application server 40 receives a message D6 from the operator's location server 50, which message D6 comprises the location of the user of the terminal 10.

When the voice resource server 20 receives the user's voice response V3, it generates a message D7 comprising digital data representing that response and addressed to the application server 40. This digital response data is not interpreted directly by the voice resource server 20.

Be this as it may, the response D7 is received by the application server 40 during a step E30.

The application server 40 interprets this response as the user's authorization or refusal to supply the location personal data to the service provider 30.

If this response represents an authorization, the application server 40 sends the location personal data to the voice resource server 20 during a step E40. Otherwise, the application server 40 can send the voice resource server 20 a refusal notification.

The personal data or the refusal notification is included in a message D8.

On receipt of the message D8, the voice resource server 20 solicits the service provider 30 by sending a message D9 including either the location of the user of the telephone terminal 10 or that user's refusal to communicate that location to the service provider 30.

What is claimed is:

1. An application server that can be hosted by a telephony operator, including:
   means for obtaining personal data of a user from said operator;
   means for communicating with a third party voice resource server adapted to:
      receive from the voice resource server a request for obtaining at least one item of personal data with the aim of sending it to a predetermined service provider;
      send to that voice resource server digital data that is not interpreted by said voice resource server and is used in a voice call between the voice resource server and said user to obtain the user's authorization or refusal to supply said personal data to the predetermined service provider;
      receive digital data representing said user's response via the voice resource server, said response data not being interpreted by said voice resource server; and
      send said personal data to said voice resource server if said response represents said user's authorization.

2. An application server according to claim 1, wherein said personal data is user location data obtained by said application server from a location server managed by said operator.

3. An application server according to claim 1, wherein said communications means are adapted to communicate with said voice resource server in accordance with the VXML standard.

4. A method of managing personal data of a user who is a subscriber of a telephony operator, said management method including:
   a step of receiving from the voice resource server a request for obtaining at least one item of personal data with the aim of sending it to a predetermined service provider;
   a step of sending to that voice resource server digital data that is not interpreted by said voice resource server and is used in a voice call between the voice resource server and said user to obtain the user's authorization or refusal to supply said personal data to the predetermined service provider;
   a step of receiving digital data representing said user's response via the voice resource server, said response data not being interpreted by said voice resource server; and
   a step of sending said personal data to said voice resource server if said response represents said user's authorization.

5. A management method according to claim 4, wherein said steps of sending and receiving data conform to the VXML standard.

6. A computer program on a data medium, said program being adapted to be executed in an application server according to claim 1, wherein said program includes instructions adapted to execute a management method, said management method including:
   a step of receiving from the voice resource server a request for obtaining at least one item of personal data with the aim of sending it to a predetermined service provider;
   a step of sending to that voice resource server digital data that is not interpreted by said voice resource server and is used in a voice call between the voice resource server and said user to obtain the user's authorization or refusal to supply said personal data to the predetermined service provider;
   a step of receiving digital data representing said user's response via the voice resource server, said response data not being interpreted by said voice resource server; and
   a step of sending said personal data to said voice resource server if said response represents said user's authorization.

7. A data medium readable by an application server according to claim 1 and containing instructions of a computer program adapted to be executed in the application server, wherein the program includes instructions adapted to execute a management method, said management method including:
   a step of receiving from the voice resource server a request for obtaining at least one item of personal data with the aim of sending it to a predetermined service provider;
   a step of sending to that voice resource server digital data that is not interpreted by said voice resource server and is used in a voice call between the voice resource server and said user to obtain the user's authorization or refusal to supply said personal data to the predetermined service provider;
   a step of receiving digital data representing said user's response via the voice resource server, said response data not being interpreted by said voice resource server; and
   a step of sending said personal data to said voice resource server if said response represents said user's authorization.

* * * * *